US012608237B2

(12) United States Patent　　　　(10) Patent No.:　US 12,608,237 B2

Verma et al.　　　　　　　　　　　(45) Date of Patent:　　Apr. 21, 2026

(54) DETECTING AND MIGRATING A ROGUE USER APPLICATION TO AVOID FUNCTIONAL SAFETY INTERFERENCE

(71) Applicant: Red Hat, Inc., Raleigh, NC (US)

(72) Inventors: Priyanka Verma, Erlangen (DE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 579 days.

(21) Appl. No.: 17/993,695

(22) Filed: Nov. 23, 2022

(65) Prior Publication Data

US 2024/0168820 A1　　May 23, 2024

(51) Int. Cl.
　　*G06F 9/50*　　　　(2006.01)
　　*B60W 50/04*　　　(2006.01)
　　　　　(Continued)

(52) U.S. Cl.
　　CPC ........... *G06F 9/5055* (2013.01); *B60W 50/04* (2013.01); *B60W 50/06* (2013.01); *G06F 9/4856* (2013.01); *G06F 9/5027* (2013.01); *G06F 11/3006* (2013.01); *G06F 21/53* (2013.01); *B60W 2050/0043* (2013.01); *G06F 9/5088* (2013.01); *G06F 2209/482* (2013.01); *G06F 2209/484* (2013.01); *G06F 2209/485* (2013.01); *G06F 2209/5021* (2013.01); *G06F 2209/503* (2013.01)

(58) Field of Classification Search
　　None
　　See application file for complete search history.

(56) References Cited

U.S. PATENT DOCUMENTS

|  |  |  |  |
|---|---|---|---|
| 8,620,873 B2 | 12/2013 | Liakos et al. | |
| 2010/0313075 A1* | 12/2010 | Liakos ................ | G06F 11/3608 714/38.1 |

(Continued)

FOREIGN PATENT DOCUMENTS

| CN | 109117639 B | 3/2021 |
|---|---|---|
| CN | 113961917 A | 1/2022 |

(Continued)

OTHER PUBLICATIONS

Ji et al., "Comparative Performance Evaluation of Intrusion Detection Methods for In-vehicle Networks", Jun. 15, 2018, Beijing, China.

*Primary Examiner* — Abu Zar Ghaffari

(74) *Attorney, Agent, or Firm* — Womble Bond Dickinson (US) LLP

(57) ABSTRACT

The method including allocating a first portion of system resources of a vehicle safety management (VSM) system to a functional safety application executing on a processing device of the VSM system. The method includes allocating a second portion of the system resources to a user application executing on the processing device of the VSM system. The method includes detecting an interference event associated with the first portion of the system resources and the second portion of the system resources that degrades a performance of the functional safety application. The method includes migrating the user application to a container image including an isolated portion of the system resources to prevent the interference event associated with the first portion of the system resources and the second portion of the system resources.

20 Claims, 5 Drawing Sheets

(51) Int. Cl.
B60W 50/06 (2006.01)
G06F 9/48 (2006.01)
G06F 11/30 (2006.01)
G06F 21/53 (2013.01)
B60W 50/00 (2006.01)

(56) References Cited

U.S. PATENT DOCUMENTS

| 2013/0218415 | A1* | 8/2013 | Stahlin | B60W 50/06 |
| | | | | 701/41 |
| 2014/0278326 | A1* | 9/2014 | Sharma | G06F 9/5066 |
| | | | | 703/13 |
| 2018/0024853 | A1* | 1/2018 | Warfield | G06F 9/45558 |
| | | | | 718/1 |
| 2018/0336351 | A1* | 11/2018 | Jeffries | G06F 21/53 |
| 2020/0082095 | A1* | 3/2020 | Mcallister | G06F 11/323 |

| 2020/0250319 | A1* | 8/2020 | Bacher | G06F 16/116 |
| 2021/0208863 | A1* | 7/2021 | Kuriata | G06F 12/0238 |
| 2022/0121470 | A1* | 4/2022 | Saxena | H04L 63/20 |
| 2022/0161828 | A1* | 5/2022 | Mikhailov | H04L 63/1425 |
| 2022/0171648 | A1* | 6/2022 | Rodriguez | G06F 9/45533 |
| 2023/0045110 | A1* | 2/2023 | Ranganathan | G06F 21/53 |
| 2023/0094125 | A1* | 3/2023 | Rogers | H04L 9/0877 |
| | | | | 713/190 |
| 2023/0112004 | A1* | 4/2023 | Hari | B60W 60/0015 |
| | | | | 701/23 |
| 2023/0315531 | A1* | 10/2023 | Shen | G06F 9/455 |
| | | | | 718/104 |

FOREIGN PATENT DOCUMENTS

| CN | 113987497 | A | 1/2022 |
| CN | 110460573 | B | 5/2022 |
| EP | 3291119 | B1 | 5/2020 |
| WO | 2021002164 | A1 | 1/2021 |

* cited by examiner

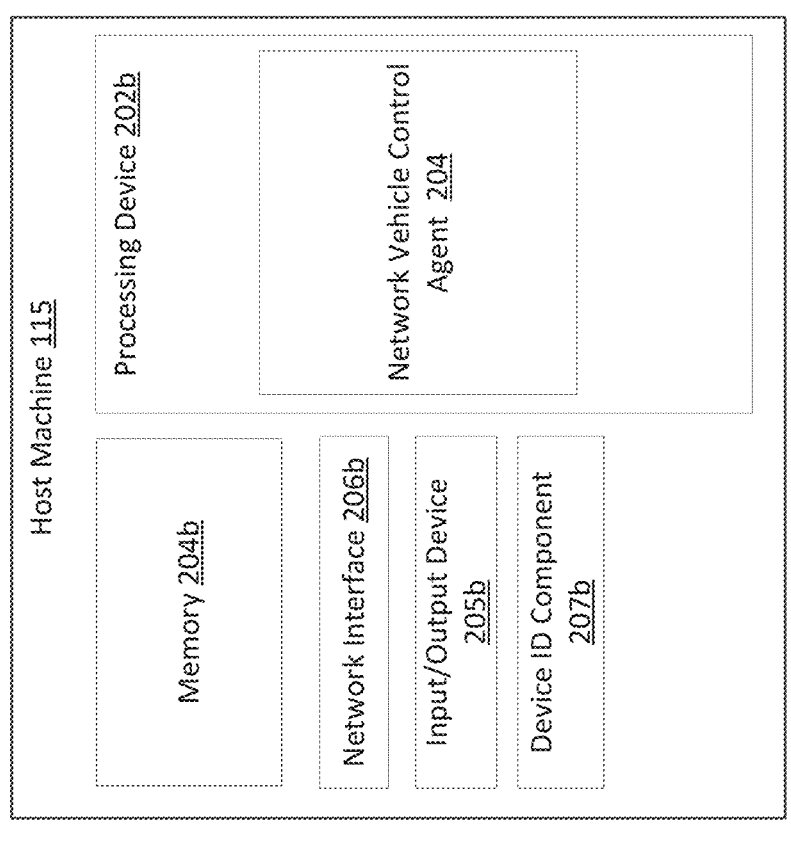

Host Machine 115

Processing Device 202b

Network Vehicle Control Agent 204

Memory 204b

Network Interface 206b

Input/Output Device 205b

Device ID Component 207b

FIG. 2B

Vehicle Safety Control (VSC) System 104

Processing Device 202a

Resource Interference Detection (RID) Agent 105

Functional Safety Application 107

User Applications 108

Container Image 110

Memory 204a

Network Interface 206a

Input/Output Device 205a

Device ID Component 207a

allocating a first portion of system resources of a vehicle safety management (VSM) system to a functional safety application executing on a processing device of the VSM system
302 allocating a second portion of the system resources to a user application executing on the processing device of the VSM system
304 detecting an interference event associated with the first portion of the system resources and the second portion of the system resources that degrades a performance of the functional safety application
306 migrating, by the processing device, the user application to a container image comprising an isolated portion of the system resources to prevent the interference event associated with the first portion of the system resources and the second portion of the system resources
308

DETECTING AND MIGRATING A ROGUE USER APPLICATION TO AVOID FUNCTIONAL SAFETY INTERFERENCE

TECHNICAL FIELD

The present disclosure relates generally to software technology, and more particularly, to systems and methods of detecting and migrating a rogue user application to a container image to avoid interfering with a functional safety application.

BACKGROUND

Containerization is the packaging together of software code with all it's necessary components like libraries, frameworks, and other dependencies so that they are isolated in their own container. This is so that the software or application within the container can be moved and run consistently in any environment and on any infrastructure, independent of that environment or infrastructure's operating system. The container acts as a kind of bubble or a computing environment surrounding the application and keeping it independent of its surroundings. It is basically a fully functional and portable computing environment.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram depicting an example vehicle safety control (VSM) system 104 in FIG. 1, according to some embodiments;

FIG. 2B is a block diagram depicting an example of the host machine 115 of the environment in FIG. 1, according to some embodiments;

FIG. 3 is a flow diagram depicting a method of detecting and migrating a user application to a container image to avoid functional safety interference, according to some embodiments.

DETAILED DESCRIPTION

Figure 1:
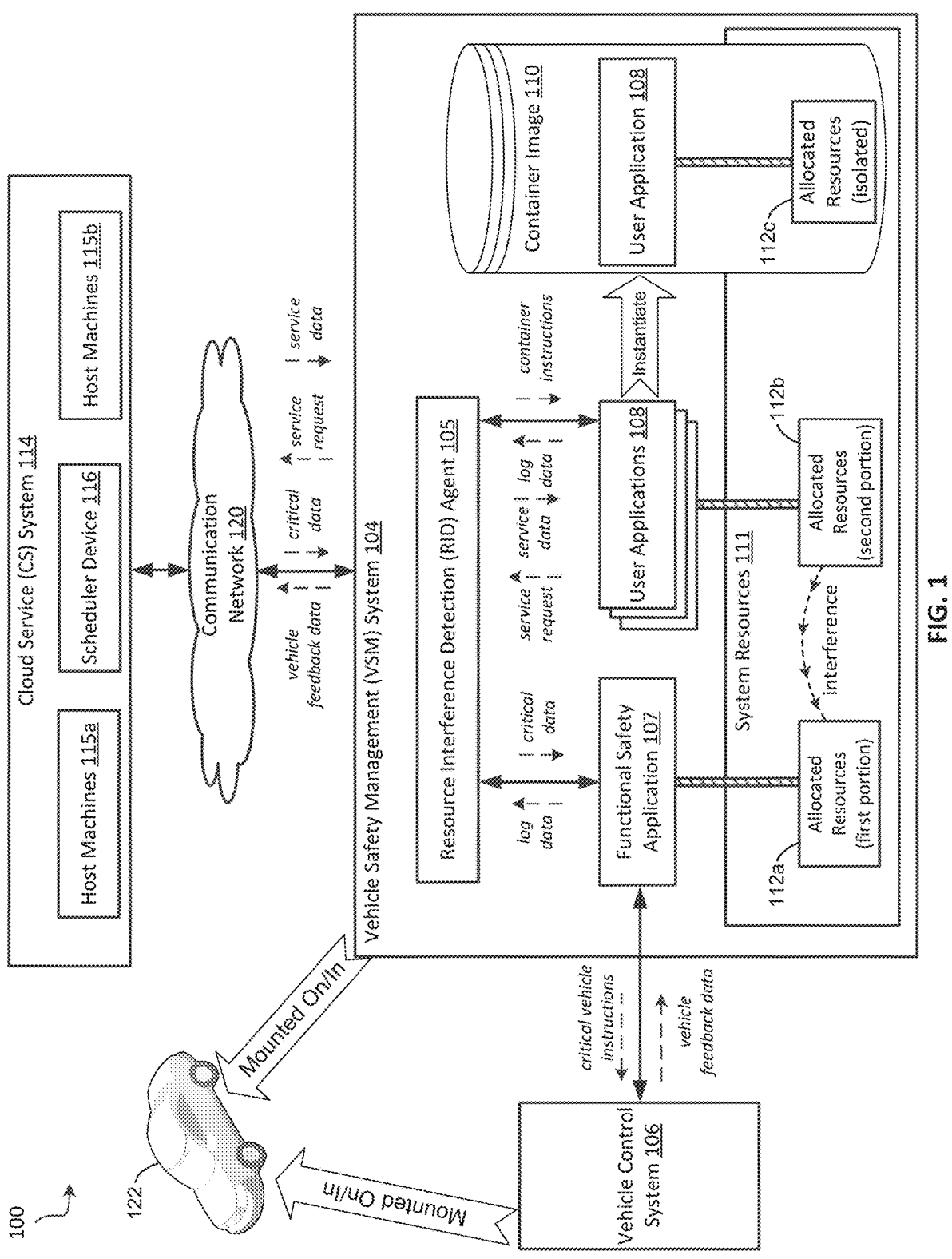
FIG. 1 is a block diagram depicting an example environment for detecting and migrating a user application to a container image to avoid interfering with a functional safety application, according to some embodiments.

Modern vehicles (e.g., automotive vehicles, marine vehicles, railed vehicles, aircraft vehicles, etc.) include computing systems that can execute one or more applications (e.g., software, computer code) to provide a variety of different critical services for managing the critical operations of the vehicle and a variety of user-services for enhancing the driving experience for the users (e.g., driver and passengers) of the vehicle. The automotive industry has a strong requirement for functional safety, and for this reason, the automotive industry classifies the applications that execute on the vehicle's computing system as being either safety-related applications (sometimes referred to as, functional safety application) or not safety-related (sometimes referred to as, user application). For example, a safety-related application might control the movement (e.g., acceleration, velocity, breaking, and/or steering) of the vehicle, while a user application might control the air conditioning in the cabin of the vehicle or provide navigational directions for the driver.

However, vehicle manufacturers struggle to ensure that their safety-related applications can freely operate without interference caused by other applications (e.g., user applications) which could pose a threat to the overall safety of the vehicle. That is, while a vehicle manufacturer can test the safety-related applications at the time of installation, the vehicle manufacturer does not know which user applications (or combination of user application) that the user will later install on the vehicle's computing system. For this reason, the vehicle manufacture cannot test for or implement counter-procedure to prevent a user-installed application from interfering with the pre-installed safety-related applications. Thus, there is a long felt need to solve the problem related to ensuring that the safety-related applications that are executing on a vehicle's computing system are free from interference that is caused by other user-applications.

Aspects of the present disclosure address the above-noted and other deficiencies by detecting and migrating a user application (sometimes referred to as, "rogue user application") to a container image to avoid interfering with a functional safety application of a vehicle. As discussed in greater detail below, a vehicle includes a vehicle safety management (VSM) system that uses its computing resources to execute a functional safety application and one or more user applications. The VSM system acquires and analyzes the diagnostic log files of the functional safety application and/or the one or more user applications to detect if/when the functional safety application has experienced an interference event (e.g., a collision).

An interference event involves the computing resources (e.g., processing, memory, networking) that are allocated to the functional safety application, such that the interference event degrades the performance of the functional safety application by interfering with its allocated resources. The interference event, for example, may be a memory out-of-bounds access error, an execution timing error, a memory allocation collision error, or a memory corruption error. The VSM system uses diagnostics to discover which of the applications has caused the interference event. This information might have been provided in the diagnostic logs or the VSM system might discover this information by checking the running application list to identify the user application that was running at the time of the error detection.

Responsive to identifying the user application, the VSM system discovers (e.g., using the /proc command) the entry point (e.g., the place in a program where the execution of a program begins, and where the program has access to command line arguments) of the user application and generates a container image that includes resources that are isolated from the resources that are allocated to the functional safety application and one or more user applications. The VSM system migrates the user application to the isolated environment of the container image to remove the possibility for the user application to interfere with the functional safety application's management of the movement of the vehicle.

In an illustrative embodiment, a VSM system allocates a first portion (e.g., a memory address space, one or more threads of a processor, one or more network ports) of system resources (e.g., processing, memory, networking) of the VSM system to a functional safety application that is executing on a processing device of the VSM system. The functional safety application is configured to manage a movement (e.g., acceleration, velocity, breaking, and/or steering) of a vehicle. The VSM system allocates a second portion of the system resources to a user application executing on the processing device of the VSM system. The VSM system detects an interference event that is associated with the first portion of the system resources and the second portion of the system resources that degrades or terminates (e.g., hinders) a performance of the functional safety application. The VSM system migrates the user application to a container image that includes (or has allocated to it) an isolated portion of the system resources to prevent the interference event that is associated with the first portion of the system resources and the second portion of the system resources. The isolated portion of the system resources is isolated from the other system resources (e.g., the first portion of the system resources and/or the second portion of the system resources), such that the activities/behavior (e.g., reads, writes) of the applications that are using the other system resources do not interfere with the performance of the container image that is using the isolated portion of the system resources to execute the user application within the container image's environment.

FIG. 1 is a block diagram depicting an example environment for detecting and migrating a user application to a container image to avoid interfering with a functional safety application of a vehicle, according to some embodiments. The environment 100 includes a cloud service system 114 and a vehicle safety management (VSM) system 104 that are each communicably coupled together via the communication network 120. The environment 100 includes a vehicle control system 106 that is communicatively coupled to the VSM system 104 via a communication bus to facilitate wired or wireless communication. The VSM system 104 and the vehicle control system 106 are each mounted (e.g., attached) on or inside a vehicle 122, such as an automotive vehicle, a marine vehicle, a railed vehicle, or an aircraft vehicle.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

The vehicle control system 106 is communicatively coupled to the machinery/components (e.g., systems, subsystems, accelerator, engine, transmission, brakes, etc.) of the vehicle 122 that control the movement of the vehicle 122. For example, the vehicle control system 106 is communicatively coupled to the acceleration system, the braking system, and the steering system of the vehicle 122. The vehicle control system 106 is configured to continuously interrogate or poll these systems for any information (shown in FIG. 1 as, vehicle feedback data) that describes a position or movement (e.g., current direction, current acceleration, current velocity, current breaking state, current steering, and/or Global Positioning System (GPS) state) of the vehicle 122. The vehicle control system 106 is configured to send the vehicle feedback data to the VSM system 104 whenever there are updates to the vehicle feedback data, or upon receiving a request from the VSM system 104 for the vehicle feedback data. The vehicle control system 106 is configured to receive one or more critical vehicle instructions from the VSM system 104, which in turn, causes the vehicle control system 106 to send the one or more critical vehicle instructions to the appropriate machinery/component of the vehicle 122 to control the movement of the vehicle 122. The critical vehicle instructions may, for example, be acceleration instructions, velocity instructions, breaking instructions, and/or steering instructions.

The VSM system 104 is configured to execute a resource interference detection (RID) agent 105, a functional safety application 107, and one or more user applications 108. The user applications may be any application that is not safety-related, such that it does not control the movement of the vehicle 122. A user application may, for example, be a music application, a movie application, a video game application, an internet application (e.g., a web browser), a navigational application (e.g., GPS maps), a telephone application, a heating/ventilation/air conditioning (HVAC) application for the cabin, etc.

Conversely, a safety-related application is configured to control the movement (e.g., acceleration, velocity, breaking, and/or steering) of the vehicle 122. For example, the functional safety application 107 is configured to receive vehicle feedback data from the vehicle control system 106 and generate critical vehicle instructions based on vehicle feedback data. The vehicle control system 106 is configured to send the critical vehicle instructions to the vehicle control system 106 to control the position and movement of the vehicle 122. As discussed below, in some embodiments, the VSM system 104 is configured to send the vehicle feedback data that it received from the vehicle control system 106 to the CS system 114 and then wait to receive critical data from the CS system 114. That is, the CS system 114 generates the critical data based on the vehicle feedback data and sends the critical data to the functional safety application 107. In response to receiving the critical data, the functional safety application 107, in this embodiment, uses the critical data to generate the critical vehicle instructions. The VSM system 104 sends the critical vehicle instructions to the vehicle control system 106.

The cloud service system 114 includes host machines 115a and 115b (collectively referred to as, "host machines 115") and a scheduler device 116 that are each communicably coupled to one another via the communication network 120 to form a cloud service system for providing services and/or computing resources (collectively referred to as, "services" or "cloud services") to the VSM system 104. The scheduler device 116 is configured to receive a request from one or more applications (e.g., functional safety application, user applications) that are executing on the processor of the VSM system 104, where the request is for the cloud service system 114 to process the request (including any data included in the request) and provide a result back to the application. The scheduler device 116 is configured to identify which host machine 115 within the cloud service system 114 is currently capable (e.g., includes the appropriate hardware and/or software) of processing the request, forward the request to the identified host machine 115, receive the result of the processed request from the host machine 115, and send the result back to the application that is executing on the VSM system 104.

For example, the scheduler device 116 may receive a request from the functional safety application 107, where the request includes vehicle feedback data that was generated by the vehicle control system 106. The scheduler device 116 may identify the host machine 115a as being capable of processing the request and send the request (including the vehicle feedback data) to the host machine 115a. The host machine 115a generates critical data based on the vehicle feedback data and sends the critical data to the scheduler device 116, which in turn, sends the critical data to the functional safety application 107. The vehicle feedback data includes any information that describes a movement (e.g., current direction, current acceleration, current velocity, current breaking state, current steering, and/or Global Positioning System (GPS) state) of the vehicle 122.

While a host machine 115 of the cloud service system 114 is processing the request from a first application, it could also be using its same resources to process a request from a second application. As a result, this could impact the speed in which the host machine 115 can calculate the first result and then provide the first result to the VSM system 104. For example, host machine 115a could simultaneously process a first request from the functional safety application 107 and a second request from one of the user applications 108. The processing of the second request might introduce an additional delay (e.g., 30 seconds, 60 seconds) in how long it takes for the host machine 115a to calculate the first result based on the vehicle feedback data and send the first result back to the VSM system 104.

Furthermore, if the user application 108 is sending/receiving communication from the VSM system 104, then this could also create a networking bottleneck (e.g., network congestion) that could further delay the time it takes for the CS system 114 to send the first result back to the functional safety application 107. If the VSM system 104 generates the critical vehicle instructions based on the critical data, then this additional data would interfere with and negatively impact the ability (e.g., responsiveness) of the VSM system 104 to efficiently and timely control the vehicle 122 to safely avoid any potential dangers.

In other words, these interferences (sometimes referred to as, an interference event) are due to the interferences or interactions that might occur between the resources that are allocated to the functional safety application 107 and the resources that are allocated to the user application 108. As shown in FIG. 1, the VSM system 104 includes system resources 111, such as processing resources (e.g., central processing unit (CPU) cores and threads), memory resources, networking resources (e.g., network bandwidth, network ports), and data storage resources. When the VSM system 104 executes the functional safety application 107, the VSM system 104 initially determines a first amount of resources to execute the functional safety application 107 on the processing device of the VSM system 104. For example, the VSM system 104 might determine that the VSM system 104 can execute (error-free) the functional safety application 107 using 1 CPU core with 2 threads, 100 megabytes of memory space, and a network port with 5 megabits per second (Mbps) of network bandwidth. The VSM system 104 then allocates, based on the first amount of resources, a first portion 112a (e.g., a memory address space, a network port, and/or a network bandwidth) of the system resources 111 to be used by the functional safety application 107. Likewise, when the VSM system 104 executes one of the user applications 108, the VSM system 104 initially determines a second amount of resources to execute the user application 108 on the processing device of the VSM system 104. The VSM system 104 then allocates, based on the second amount of resources, a second portion 112b of the system resources 111 to be used by the user application 108.

However, when the VSM system 104 simultaneously executes the functional safety application 107 and the user application 108, the user application's 108 use of its respective allocated system resources can create an interference event associated with the allocated resources of the functional safety application 107. This interference event can degrade a performance of the functional safety application 107, such as a capability to acquire feedback data from the vehicle control system 106 of the vehicle 122, a capability to generate critical vehicle instructions based on the feedback data, and/or a capability to send the critical vehicle instructions to the vehicle control system 106 to manage the movement of the vehicle 122. The interference event, for example, may be a memory out-of-bounds access error, an execution timing error, a memory allocation collision error, a memory corruption error, or a network bottleneck (e.g., congestion).

The RID agent 105 is configured to detect the occurrence of an interference event that is associated with the allocated resources (e.g., first portion 112a) of the functional safety application 107 and the allocated resources (second portion 112b) of the user application 108. To terminate and prevent a re-occurrence of the interference event, the RID agent 105 is configured to create (e.g., instantiate) a container image 110 that includes an isolated portion 112c of the system resources 111 and migrate the user application 108 to the container image 110, such that the user application 108 can only use the isolated portion 112c of the container image 110 to execute within the environment of the container image. Specifically, the isolated portion 112 of the system resources 111 is isolated from the other portions (first portion 112a, second portion 112b) of the system resources 111. Therefore, if other user applications 108 use any of the other portions of the system resources 111, then those uses cannot create an interference event that is associated with the isolated portion 112 of the system resources 111, and in turn, degrade a performance of the functional safety application 107.

A host machine 115, a scheduler device 116, a VSM system 104, and a vehicle control system 106 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

Still referring to FIG. 1, the VSM system 104 allocates a first portion 112a of the system resources 111 of the VSM system 104 to a functional safety application 107 that is executing on a processing device of the VSM system 104. The functional safety application 107 is configured to manage a movement of the vehicle 122. The VSM system 104 allocates the second portion 112b of the system resources 111 to the user application 108 that is executing on the processing device of the VSM system 104. The VSM system 104 detects an interference event that is associated with the first portion 112a and the second portion 112b that degrades a performance of the functional safety application 107. The VSM system 104 migrates the user application 108 to the container image 110 that includes the isolated portion 112c of the system resources 111 to terminate and prevent a re-occurrence of the interference event.

Although FIG. 1 shows only a select number of cloud service systems (e.g., cloud service system 114) and computing devices (e.g., host machine 115a, host machine 115b, scheduler device 116, VSM system 104); the environment 100 may include any number of cloud service systems and computing devices that are interconnected in any arrangement to facilitate the exchange of data between the cloud service systems and computing devices.

FIG. 2A is a block diagram depicting an example vehicle safety control (VSM) system 104 in FIG. 1, according to some embodiments. While various devices, interfaces, and logic with particular functionality are shown, it should be understood that the VSM system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The VSM system 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the VSM system 104. In some embodiments, the processing device 202a and the memory 204a form various processing devices and/or circuits described with respect to the VSM system 104. The instructions include code from any suitable computer programming language such as, but not limited to, C, C++, C#, Java, JavaScript, VB Script, Perl, HTML, XML, Python, TCL, and Basic.

The processing device 202a executes a functional safety application 107 that is communicatively coupled to the vehicle control system 106 of the vehicle 122. The functional safety application 107 is configured to generate critical vehicle instructions and send the critical vehicle instruction to the vehicle control system 106 to control the position and movement (e.g., acceleration, velocity, breaking, and/or steering) of the vehicle 122. For example, the functional safety application 107 is configured to receive vehicle feedback data from the vehicle control system 106 and critical data from the CS system 114. The functional safety application 107 is configured to generate critical vehicle instructions based on the vehicle feedback data and/or the critical data and then send the critical vehicle instructions to the vehicle control system 106 to control the position and movement of the vehicle 122.

The functional safety application 107 is configured to generate one or more diagnostic log files that each include information that describes all behavior (prior and real-time) of the functional safety application since launching, and a status (including errors) of the state of the resources that are allocated to the functional safety application 107. The functional safety application 107 is configured to send the one or more diagnostic log files to the RID agent 105.

The processing device 202a executes one or more user applications 108 that are each configured to provide services for enhancing the driving experience for the users (e.g., driver and passengers) of the vehicle 122. A user application 108 may, for example, be a music application, a movie application, a video game application, an internet application (e.g., a web browser), an email reader application, a navigational application (e.g., GPS maps), a telephone application, a heating/ventilation/air conditioning (HVAC) application for the cabin, etc. The user application 108 is configured to send requests (shown in FIG. 1 as, service request) to the CS system 114 for data (shown in FIG. 1 as, service data), receive the service data from the CS system 114, and process the service data to provide services for enhancing the driving experience for the users. The CS system 114 uses its resources and the resources of the communication network 120 to receive and process the service requests, and generate and transmit the service data. In some embodiments, these uses of the resources may negatively impact (e.g., adds delays) the ability for the CS system 114 to timely provide critical data to the functional safety application.

The user application 108 is configured to generate one or more diagnostic log files that each include information that describes all behavior (prior and real-time) of the user application 108 since launching, and a status (including errors) of the state of the resources that are allocated to the user application 108. The user application 108 is configured to send the one or more diagnostic log files to the RID agent 105.

The processing device 202a executes a resource interference detection (RID) agent 105 that may be configured to allocate a first portion (e.g., first portion 112a) of the system resources 111 of the VSM system 104 to the functional safety application 107 that is executing on the processing device 202a of the VSM system 104, where the functional safety application 107 is configured to manage a movement (e.g., acceleration action, a braking action, or a steering action) of the vehicle 122. The RID agent 105 may be configured to allocate a second portion (e.g., second portion 112b) of the system resources 111 to a user application 108 that is executing on the processing device 202a of the VSM system 104. The RID agent 105 may be configured to detect an interference event associated with the first portion 112a of the system resources 111 and the second portion 112b of the system resources 111 that degrades a performance of the functional safety application 107. The RID agent 105 may be configured to migrate the user application 108 to a container image 110 that includes an isolated portion (isolated portion 112c) of the system resources 111 to prevent the interference event that is associated with the first portion 112a of the system resources 111 and the second portion 112b of the system resources 111.

A container image 110 is a standard unit of software that packages up code and one or more (e.g., or all) of its dependencies so that a software application may run efficiently and reliably from one computing environment to another. That is, a container image 110 is a lightweight, standalone, executable package of software that includes everything (e.g., system resources, code, runtime, system tools, system libraries and settings) needed to run an application. The container image 110 includes layers (e.g., image layers) that are stacked on top of one other.

A layer of the container image 110 may include application code, libraries, system tools, dependencies, configuration/setting files, environment variables, runtimes, and other files needed to make an application execute. A layer may be configured to provide a service. Non-limiting examples of a service include a database or repository service, a compute service, a file system service, a cloud storage service, an application service (e.g., functional safety application 107, user application 108), a network service, a network traffic management service, a cybersecurity service, etc.

A container image 110 that includes multiple layers may provide a variety of different types of services according to the layers, wherein each layer uses (e.g., allocates, reserves) a particular set of computing resources (e.g., system resources 111) and a particular amount of each computing resource (e.g., computing/processing, data storage, memory) of the computing environment that executes the container image 110. For example, a first layer of container image 110 may be configured to provide a database service that uses 1 gigabyte (GB) of data storage and 100 megabytes (MB) of memory of the computing environment (e.g., VSM system 104, communication network 120), and a second layer of the container image 110 may be configured to provide a file system service that uses 0.5 gigabyte (GB) of data storage and 50 megabytes (MB) of memory of the computing environment, and a third layer of container image 110 may be configured to provide a network service that uses 200 megabytes (MB) of memory and no amount of data storage of the computing environment.

In some embodiments, the layers of a container image 110 may each use a different amount of computing resources to provide an identical or substantially identical service. For example, a first layer of container image 110 may be configured to provide a database service and a second layer of container image 110 may also be configured to provide the same or substantially similar database service. However, the first layer may be configured to have a high priority status to cause the computing environment to allocate 25% of its compute (e.g., central processing unit (CPU)) resources to the first layer, and the second layer may be configured to have a low priority status to cause the computing environment to allocate 5% of its compute resources to the second layer. As such, the database service provided by the first layer may operate faster, more accurately, and/or more efficiently than the database service provided by the second layer.

The RID agent 105 may be configured to use operating system (OS)-level virtualization of the VSM system 104 to package software (e.g., functional safety application 107, user application 108) into a container image 110 and to execute the container image 110. For example, the RID agent 105 may be configured to generate (e.g., create, build) a container image 110 using one or more files (e.g., container image file, Docker file) of a software application project. In some embodiments, the RID agent 105 may include one or more features of the open-source version of Docker. In some embodiments, the RID agent 105 includes an application programming interface (API; sometimes referred to as, "Docker API") for interacting with a daemon (sometimes referred to as, "Docker Engine API"), as well as software development kits (SDKs). In some embodiments, the SDKs allow the RID agent 105 to build and scale applications (e.g., Docker apps) and solutions quickly and easily.

The RID agent 105 may be configured to detect an interference event is based on a diagnostic log file that is generated by the functional safety application 107.

The RID agent 105 may be configured to inspect one or more operating system components of the VSM system 104 for component information that is associated with the second portion 112b of the system resources 111 that are allocated to the user application 108. In some embodiments, the operating system component is a task manager, a network manager, or a memory manager.

The RID agent 105 may be configured to determine based on the component information that the user application 108 is causing the interference event that degrades the performance of the functional safety application 107.

The RID agent 105 may be configured to migrate the user application to the container image 110 by executing the container image 110 to cause the user application 108 of the container image 110 to use the isolated portion 112c of the system resources 111 while the functional safety application 107 uses the first portion 112a of system resources 111.

The RID agent 105 may be configured to generate the container image 110 responsive to detecting the interference event associated with the first portion 112a of the system resources 111 and the second portion 112b of the system resources 111.

The RID agent 105 may be configured to generate the container image 110 by determining an amount of resources to execute the user application 108 on the processing device 202a of the VSM system 104, identifying an available portion of the system resources 111 based on the amount of resources; and allocating the available portion of the system resources 111 to the container image 110 to be used as the isolated portion 112c of the system resources 111.

In some embodiments, the user application 108 is configured to receive a stream of network traffic, and the RID agent 105 may be configured to migrate the user application 108 to the container image 110 without interrupting a service of the user application 108 by redirecting a portion of the stream of the network traffic to the container image 110; validating an operation of the container image 110; and directing the stream of network traffic to the container image 110 responsive to confirming the operation of the container image 110.

In some embodiments, the interference event corresponds to a memory out-of-bounds access error, a memory allocation collision error, a memory corruption error, or a timing error.

In some embodiments, the performance of the functional safety application 107 that is degraded by the interference event includes a capability to acquire feedback data from a vehicle control system 106 of the vehicle 122, a capability to generate critical vehicle instructions based on the feedback data, and a capability to send the critical vehicle instructions to the vehicle control system 106 to manage the movement of the vehicle 122.

The VSM system 104 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the VSM system 104 includes a plurality of network interfaces 206a of different types, allowing for connections to a variety of networks, such as local area networks (public or private) or wide area networks including the Internet, via different sub-networks.

The VSM system 104 includes an input/output device 205a configured to receive user input from and provide information to a user. In this regard, the input/output device 205a is structured to exchange data, communications, instructions, etc. with an input/output component of the VSM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the VSM system 104, such as a built-in display, touch screen, microphone, etc., or external to the housing of the VSM system 104, such as a monitor connected to the VSM system 104, a speaker connected to the VSM system 104, etc., according to various embodiments. In some embodiments, the VSM system 104 includes communication circuitry for facilitating the exchange of data, values, messages, and the like between the input/output device 205a and the components of the VSM system 104. In some embodiments, the input/output device 205a includes machine-readable media for facilitating the exchange of information between the input/output device 205a and the components of the VSM system 104. In still another embodiment, the input/output device 205a includes any combination of hardware components (e.g., a touchscreen), communication circuitry, and machine-readable media.

The VSM system 104 includes a device identification component 207a (shown in FIG. 2A as device ID component 207a) configured to generate and/or manage a device identifier associated with the VSM system 104. The device identifier may include any type and form of identification used to distinguish the VSM system 104 from other computing devices. In some embodiments, to preserve privacy, the device identifier may be cryptographically generated, encrypted, or otherwise obfuscated by any device and/or component of the VSM system 104. In some embodiments, the VSM system 104 may include the device identifier in any communication (e.g., public encrypted message, private encrypted message, etc.) that the VSM system 104 sends to a computing device.

The VSM system 104 includes a bus (not shown), such as an address/data bus or other communication mechanism for communicating information, which interconnects the devices and/or components of VSM system 104, such as processing device 202a, network interface 206a, input/output device 205a, and/or device ID component 207a.

In some embodiments, some or all of the devices and/or components of VSM system 104 may be implemented with the processing device 202a. For example, the VSM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the host machine 115 of the environment in FIG. 1, according to some embodiments. While various devices, interfaces, and logic with particular functionality are shown, it should be understood that the host machine 115 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The host machine 115 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the host machine 115 instead of devices and/or components of the VSM system 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the host machine 115 instead of devices and/or components of the VSM system 104.

The processing device 202b may execute a network vehicle control agent 204 that is configured to receive requests (shown in FIG. 1 as, service request) from a user application 108 via the scheduler device 116. The network vehicle control agent 204 is configured to process the service request, generate service data based on the service request, and send the service data to the user application 108 via the scheduler device 116. The service data may provide one or more services that enhance the driving experience for the users. The network vehicle control agent 204 uses the resources of the CS system 114 and the resources of the communication network 120 to receive and process the service requests, and generate and transmit the service data. In some embodiments, these uses of the resources may negatively impact (e.g., adds delays) the ability for the CS system 114 to timely provide critical data to the functional safety application 107.

The host machine 115 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the host machine 115 instead of devices and/or components of the VSM system 104.

The host machine 115 includes an input/output device 205b configured to receive user input from and provide information to a user. In this regard, the input/output device 205b is structured to exchange data, communications, instructions, etc. with an input/output component of the host machine 115. The input/output device 205b includes identical or nearly identical functionality as input/output device 205a in FIG. 2A, but with respect to devices and/or components of the host machine 115 instead of devices and/or components of the VSM system 104.

The host machine 115 includes a device identification component 207b (shown in FIG. 2B as device ID component 207b) configured to generate and/or manage a device identifier associated with the host machine 115. The device ID component 207b includes identical or nearly identical functionality as device ID component 207a in FIG. 2A, but with respect to devices and/or components of the host machine 115 instead of devices and/or components of the VSM system 104.

The host machine 115 includes a bus (not shown), such as an address/data bus or other communication mechanism for communicating information, which interconnects the devices and/or components of the VSM system 104, such as processing device 202b, network interface 206b, input/output device 205b, and/or device ID component 207b.

In some embodiments, some or all of the devices and/or components of host machine 115 may be implemented with the processing device 202b. For example, the host machine 115 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2C:
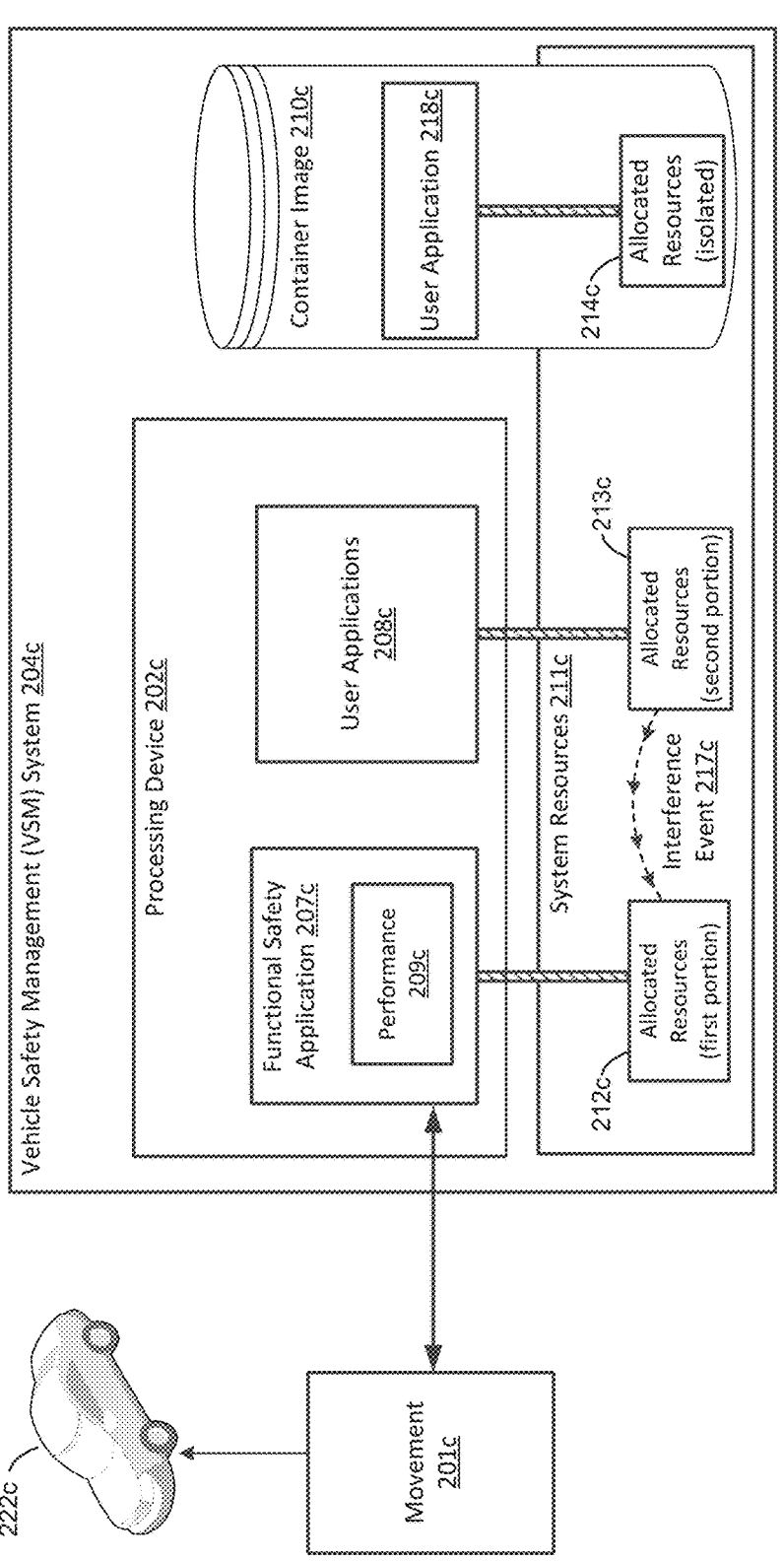
FIG. 2C is a block diagram depicting an example environment for using a VSM system, according to some embodiments.

FIG. 2C is a block diagram depicting an example environment for using a VSM system, according to some embodiments. In some embodiments, the VSM system 104 is the VSM system 104 in FIG. 1. The environment 200c includes VSM system 104 and a vehicle 222c that has a movement 201c. The VSM includes a processing device 202c, system resources 211c, and a container image 210c. The processing device includes a functional safety application 207c and a user application 208c. The functional safety application 207c is associated with a performance 209c. The system resources 211c includes a first portion 212c of resources, a second portion 213c of resources, and an isolated portion 214c of resource. The container image 210c includes a user application 218c and the isolated portion 214c of resources.

The processing device 202c allocates a first portion 212c of system resources 211c of a VSM system 204c to a functional safety application 207c that is executing on the processing device 202c of the VSM system 204c. The functional safety application 207c is configured to manage the movement 201c of the vehicle 222c. The processing device 202c allocates a second portion 213b of the system resources 211c to the user application 208c executing on the processing device 202c of the VSM system 204c. The VSM system 204c detects the interference event 217c that is associated with the first portion 212c of the system resources 211c and the second portion 213c of the system resources 211c that degrades a performance 209c of the functional safety application 207c. The VSM system 204c migrates the user application 208c to a container image 210c that includes an isolated portion 214c of the system resources 211c to prevent the interference event 217c that is associated with the first portion 212c of the system resources 211c and the second portion 213c of the system resources 211c.

FIG. 3 is a flow diagram depicting a method of detecting and migrating a user application to a container image to avoid functional safety interference, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a vehicle safety management system, such as VSM system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of allocating (e.g., assigning, reserving) a first portion of system resources of a vehicle safety management (VSM) system to a functional safety application executing on a processing device of the VSM system. The method 300 includes the block 304 of allocating a second portion of the system resources to a user application executing on the processing device of the VSM system. The method 300 includes the block 306 of detecting an interference event associated with the first portion of the system resources and the second portion of the system resources that degrades a performance of the functional safety application. The method 300 includes the block 308 of migrating, by the processing device, the user application to a container image comprising an isolated portion of the system resources to prevent the interference event associated with the first portion of the system resources and the second portion of the system resources.

Figure 4:
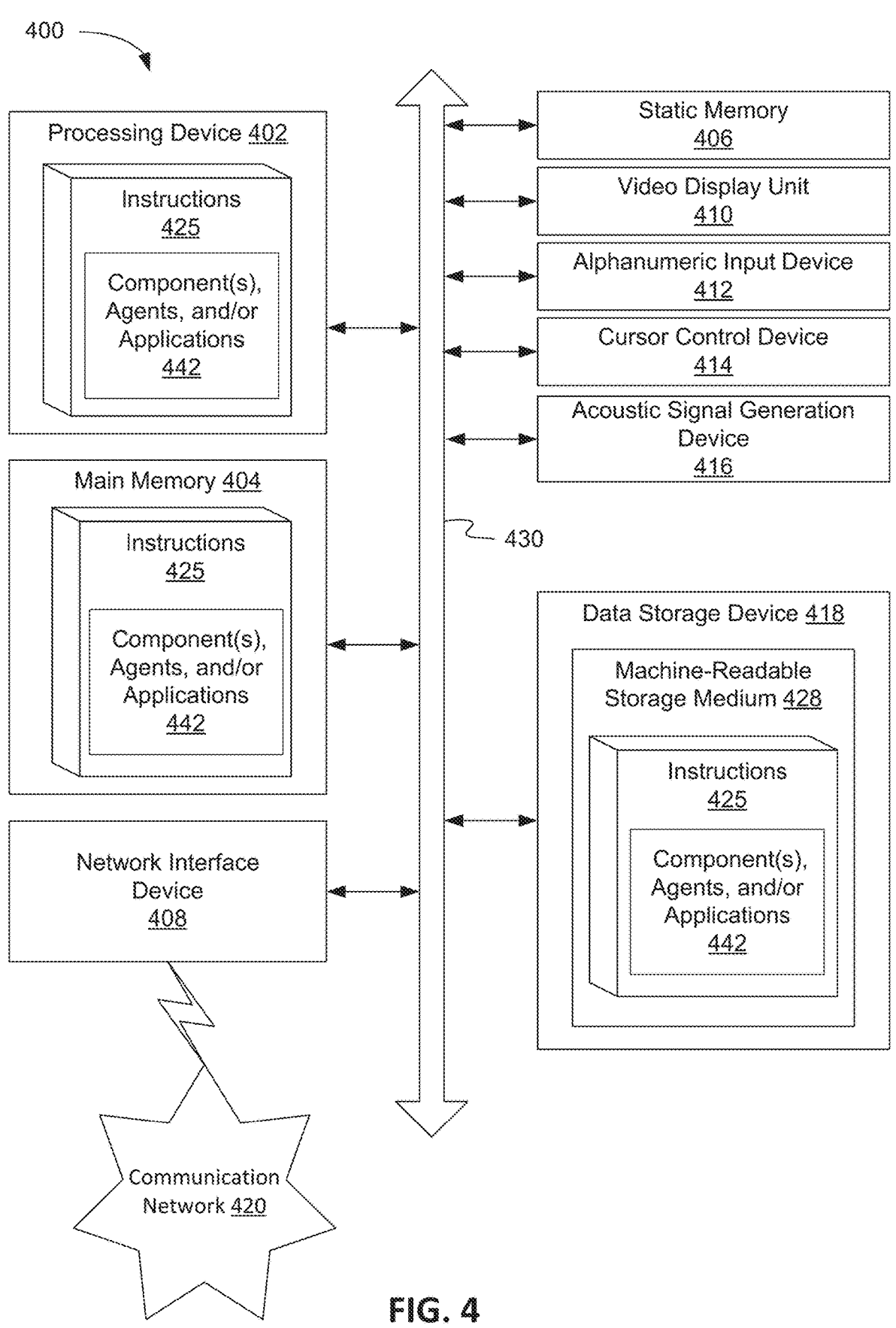
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components, agents, and/or applications 442 (e.g., RID agent 105, functional safety application 107, user application 108, container image 110 in FIG. 2A) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "allocating," "detecting," "migrating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

allocating a first portion of system resources of a vehicle safety management (VSM) system to a functional safety application executing on a processing device of the VSM system;

allocating a second portion of the system resources to a user application executing on the processing device of the VSM system, wherein the system resources comprise at least one of processing resources, memory resources, or networking resources;

detecting an interference event associated with the first portion of the system resources and the second portion of the system resources that degrades a performance of the functional safety application;

identifying, responsive to detecting the interference event, an entry point of the user application, the entry point comprising a location in the user application where execution begins and where commands associated with the user application are accessible;

generating, based on the entry point, a container image comprising multiple layers and an isolated portion of the system resources, wherein generating the container image further comprises assigning different priority levels to the multiple layers and allocating different amounts of the isolated portion of the system resources to the multiple layers according to the different priority levels; and migrating, by the processing device, the user application to the container image to prevent the interference event associated with the first portion of the system resources and the second portion of the system resources.

2. The method of claim 1, wherein the functional safety application is configured to manage a movement of a vehicle associated with the VSM system, and wherein the movement comprises at least one of an acceleration action, a braking action, or a steering action of the vehicle.

3. The method of claim 1, wherein detecting the interference event is further based on a diagnostic log file that is generated by the functional safety application.

4. The method of claim 3, further comprising:

inspecting one or more operating system components of the VSM system for component information associated with the second portion of the system resources that are allocated to the user application; and determining, based on the component information, that the user application is causing the interference event that degrades the performance of the functional safety application.

5. The method of claim 4, wherein the operating system component comprises a task manager, a network manager, or a memory manager.

6. The method of claim 1, wherein migrating the user application comprises:

executing, by the processing device, the container image to cause the user application of the container image to use the isolated portion of the system resources while the functional safety application uses the first portion of system resources.

7. The method of claim 1, further comprising:

generating the container image responsive to detecting the interference event associated with the first portion of the system resources and the second portion of the system resources.

8. The method of claim 7, wherein generating the container image comprises:

determining an amount of resources to execute the user application on the processing device of the VSM system;

identifying an available portion of the system resources based on the amount of resources; and allocating the available portion of the system resources to the container image to be used as the isolated portion of the system resources.

9. The method of claim 1, wherein the user application is configured to receive a stream of network traffic, and wherein migrating the user application to the container image is further without interrupting a service of the user application by:

redirecting, after executing the container image, a portion of the stream of the network traffic to the container image;

validating an operation of the container image; and directing the stream of network traffic to the container image responsive to confirming the operation of the container image.

10. The method of claim 1, wherein the interference event corresponds to a memory out-of-bounds access error, a memory allocation collision error, a memory corruption error, or a timing error.

11. The method of claim 1, wherein the performance of the functional safety application that is degraded by the interference event comprises:

a capability to acquire feedback data from a vehicle control system of a vehicle;

a capability to generate vehicle instructions based on the feedback data; and a capability to send the vehicle instructions to the vehicle control system to manage a movement of the vehicle.

12. A system comprising:

a memory; and a processing device, operatively coupled to the memory, to:

allocate a first portion of system resources of a vehicle safety management (VSM) system to a functional safety application executing on a processing device of the VSM system, wherein the system resources comprise at least one of processing resources, memory resources, or networking resources;

allocate a second portion of the system resources to a user application executing on the processing device of the VSM system;

detect an interference event associated with the first portion of the system resources and the second portion of the system resources that degrades a performance of the functional safety application;

identify, responsive to detecting the interference event, an entry point of the user application, the entry point comprising a location in the user application where execution begins and where commands associated with the user application are accessible;

generate, based on the entry point, a container image comprising an isolated portion of the system resources, wherein to generate the container image, the processing device is further to assign different priority levels to the multiple layers and allocate different amounts of the isolated portion of the system resources to the multiple layers according to the different priority levels; and migrate the user application to the container image to prevent the interference event associated with the first portion of the system resources and the second portion of the system resources.

13. The system of claim 12, wherein the functional safety application is configured to manage a movement of a vehicle associated with the VSM system, and wherein at least one of:

the movement comprises at least one of an acceleration action, a braking action, or a steering action of the vehicle, or the interference event corresponds to a memory out-of-bounds access error, a memory allocation collision error, a memory corruption error, or a timing error.

14. The system of claim 12, wherein to detect the interference event is further based on a diagnostic log file that is generated by the functional safety application.

15. The system of claim 14, wherein the processing device is further to:

inspect one or more operating system components of the VSM system for component information associated with the second portion of the system resources that are allocated to the user application; and determine, based on the component information, that the user application is causing the interference event that degrades the performance of the functional safety application.

16. The system of claim 15, wherein the operating system component comprises a task manager, a network manager, or a memory manager.

17. The system of claim 12, wherein to migrate the user application is further to:

execute, by the processing device, the container image to cause the user application of the container image to use the isolated portion of the system resources while the functional safety application uses the first portion of system resources.

18. The system of claim 17, wherein the processing device is further to:

determine an amount of resources to execute the user application on the processing device of the VSM system;

identify an available portion of the system resources based on the amount of resources; and allocate the available portion of the system resources to the container image to be used as the isolated portion of the system resources.

19. The system of claim 12, wherein the user application is configured to receive a stream of network traffic, and wherein to migrate the user application to the container image is further without interrupting a service of the user application, the processing device further to:

redirect, after executing the container image, a portion of the stream of the network traffic to the container image;

validate an operation of the container image; and direct the stream of network traffic to the container image responsive to confirming the operation of the container image.

20. A non-transitory computer-readable medium storing instructions that, when execute by a processing device of a vehicle safety management (VSM) system, cause the processing device to:

allocate a first portion of system resources of the VSM system to a functional safety application executing on a processing device of the VSM system, wherein the system resources comprise at least one of processing resources, memory resources, or networking resources;

allocate a second portion of the system resources to a user application executing on the processing device of the VSM system;

detect an interference event associated with the first portion of the system resources and the second portion of the system resources that degrades a performance of the functional safety application;

identify, responsive to detecting the interference event, an entry point of the user application, the entry point comprising a location in the user application where execution begins and where commands associated with the user application are accessible;

generate, based on the entry point, a container image comprising an isolated portion of the system resources, wherein to generate the container image, the processing device is further to assign different priority levels to the multiple layers and allocate different amounts of the isolated portion of the system resources to the multiple layers according to the different priority levels; and migrate, by the processing device, the user application to the container image to prevent the interference event associated with the first portion of the system resources and the second portion of the system resources.

* * * * *